M. W. ROGERS.
INSECT EXTERMINATOR.
APPLICATION FILED AUG. 2, 1920.
1,405,334.
Patented Jan. 31, 1922.
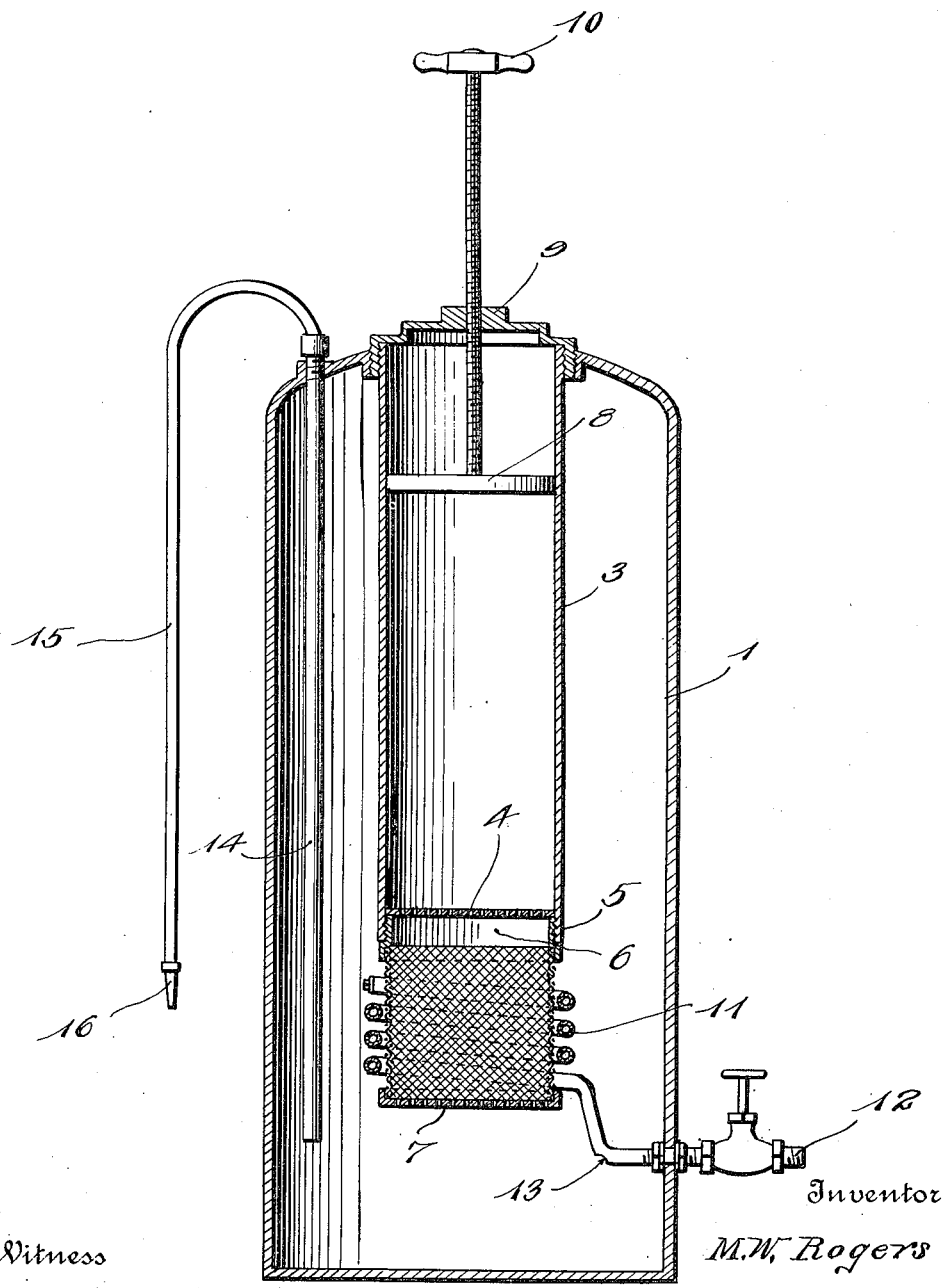

UNITED STATES PATENT OFFICE.

MIRON W. ROGERS, OF HARWICH, MASSACHUSETTS.

INSECT EXTERMINATOR.

1,405,334.  Specification of Letters Patent.  Patented Jan. 31, 1922.

Application filed August 2, 1920. Serial No. 400,788.

*To all whom it may concern:*

Be it known that I, MIRON W. ROGERS, a citizen of the United States, residing at Harwich, Cape Cod, in the county of Barnstable and State of Massachusetts, have invented certain new and useful Improvements in Insect Exterminators, and I do declare the following to be a full, clear, and exact description of the invention, such as will enable others skilled in the art to which it appertains to make and use the same.

This invention relates broadly to insect exterminators and more specifically to a sprayer which is adapted to contain an insecticide, either fluid or powder, to be ejected from it onto the trees and plants for the purpose of killing and permanently disposing of insects.

The main object of the invention is to generally improve upon devices of this class by producing one of extreme simplicity and durability which is easy to manipulate, highly effective in operation, light to carry and inexpensive to both the manufacturer and the user.

Another object of the invention is to provide a device of the above mentioned class which includes a container for the insecticide and a mixing chamber for the same, the insecticide being forced from the container into the mixing chamber by a plunger, there being a fluid feed pipe surrounding it and serving to thoroughly mix the fluid and insecticide, this feed pipe also including means for agitating and more completely mixing the fluid and insecticide.

Other objects and advantages of the invention will be apparent during the course of the following description.

In the accompanying drawing forming a part of this specification and in which like numerals are employed to designate like parts throughout the same:

The figure is a central vertical sectional view, with parts in elevation, of an insect exterminator constructed in accordance with my invention.

Referring to the drawing, wherein the preferred embodiment of my invention is shown, the numeral 1 designates a receptacle or tank which is closed at its bottom and provided in its top with a screw-threaded opening. Insertable through this opening is a removable cylindrical container 3 for the insecticide and the inner end of this container is provided with a perforated partition 4 below which is an internally screw-threaded flange 5. Detachably connected with this flange is a screw-threaded collar 6 which carries a wire-mesh mixing chamber 7. The insecticide, either powder, liquid, or other chemical is placed in the container 3 and is fed from the latter through the perforations in said partition and into the mixing chamber by means of a plunger 8 as is obvious. For the purpose of holding the container in place and permitting limited movement of the plunger, I employ an internally and externally screw-threaded cap 9 which closes the upper open end of the container 3 and is screwed onto the threads on the outer end of the latter. This cap includes a centrally disposed screw-threaded aperture through which the screw-threaded stem of the plunger extends, and the latter has a handle 10 on its outer end for the purpose of rotating it. The external threads of the cap permit it to be threaded into said opening in the top of the tank. Surrounding the mixing chamber is a perforated coiled pipe 11 which delivers fluid, either water or air, into the mixing chamber and thoroughly mixes it with the powder or other chemical. Air is forced through the pipe 11 only when liquid insecticide is used. In most instances, however, I have found it advantageous to employ either powder or paste, and mix water with it by means of the coiled pipe 11. This forms a very good spray-liquid and is very inexpensive. Proceeding to describe the construction, it is to be said that the pipe 11 is supplied with fluid by means of a valved feed pipe 12 to which an ordinary garden hose may be connected. For the purpose of further mixing and agitating the partly mixed contents of the tank, I form an opening 13 in the pipe 11, which permits the water to pass therethrough in a jet of considerable force, thus insuring a complete mixture of the powder and water. An outlet pipe 14, and a flexible distributing tube 15 of any suitable construction will be employed. The latter, of course, will be equipped with a suitable nozzle 16.

The operation of the device is as follows: Assuming that the device is assembled as shown and the insecticide has been placed in the container, the water or other fluid is passed through the pipe 11 in the desired quantity, and permitted to spray into the mixing chamber 7 into which the powder or other insecticide has been forced by means of the plunger 8. The liquid will mix with the powder and will flow from the chamber 7 into the receptacle 1. The fluid escaping from the opening 13 in the pipe 11 serves to agitate the mixture in the bottom of the tank 1. After sufficient pressure has been built up in the tank 1, the mixed contents will be forced out through the pipe 14 and through the tube 15 and the latter may be directed upon the plants and flowers. Employment of the feed plunger enables me to keep the mixing chamber supplied with the desired amount of powder at all times and by surrounding the latter with the perforated coil, thorough and rapid mixing of the fluid and powder is insured. Other constructional features and advantages are, no doubt, apparent from the foregoing description.

A careful consideration of the description taken in connection with the drawing will enable persons skilled in the art to which this invention relates to obtain a clear understanding of the same, therefore, further description is deemed unnecessary.

I claim:

1. A sprayer of the type set forth comprising a receptacle, a container for the insecticide disposed therein, being provided between its ends with a perforated partition and at its inner end with a reticular portion forming a mixing chamber, a perforated fluid feeding coil encircling said chamber for passing fluid through the latter, and discharge means for said receptacle.

2. A sprayer of the type set forth comprising a tank provided in its top with an opening, a fluid supply pipe passing through one side thereof and having its inner end horizontally disposed, coiled, and apertured, a container insertable through said opening, its inner end being perforated and receivable in said coil, and discharge means for the tank.

3. A sprayer of the type set forth comprising a tank provided in its top with a screw-threaded opening, an insecticide container insertable through the latter, being externally screw-threaded at its outer end, an internally and externally screw-threaded cap screwed onto said container and into said threaded opening, said container being provided with a perforated bottom, a detachable open-work mixing chamber connected to the bottom of the container so as to receive a portion of the contents of the latter, a plunger extending into and movable in the container, an apertured coiled pipe surrounding the mixing chamber to deliver fluid thereto, a valved supply pipe connected to the coiled pipe, and discharge means for the receptacle.

In testimony whereof I have hereunto set my hand.

MIRON W. ROGERS.